United States Patent Office 2,940,304
Patented June 14, 1960

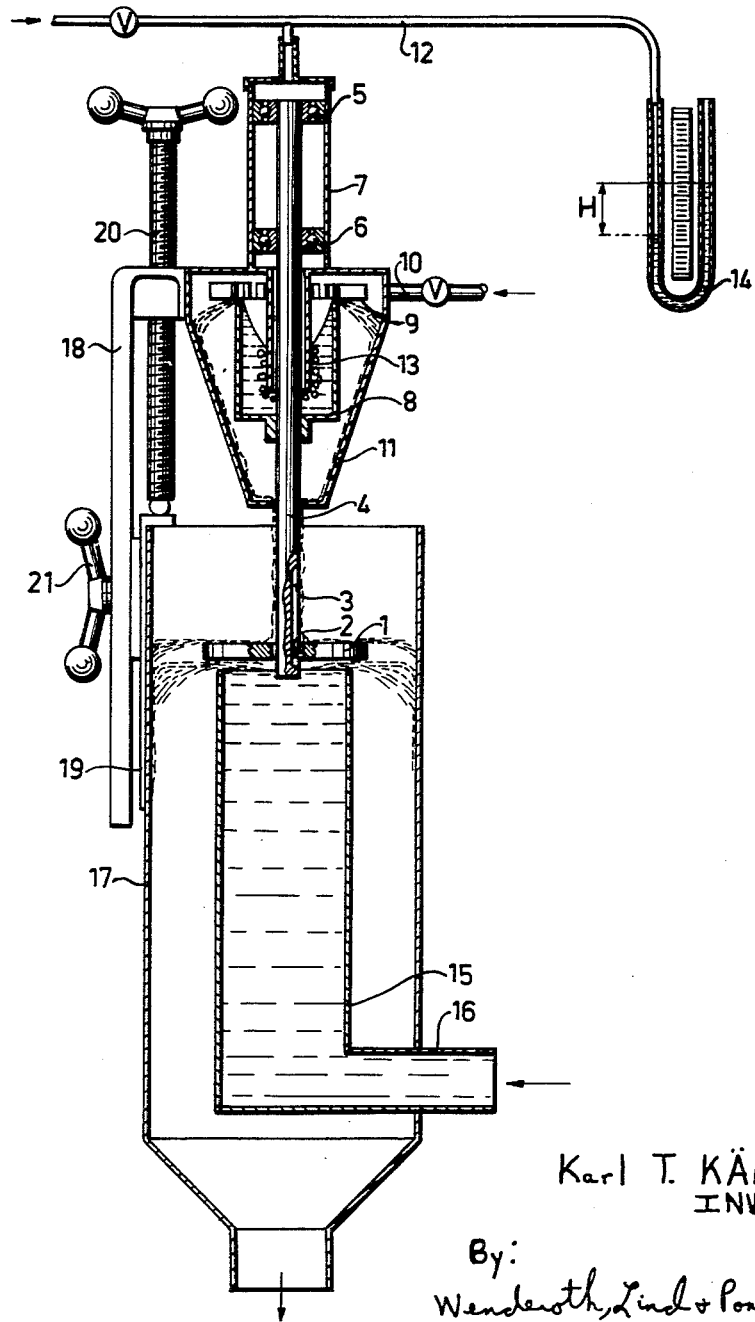

2,940,304
VISCOSIMETER OR CONSISTENCY METER

Karl Torsten Källe, Sandbacken, Saffle, Sweden

Filed Oct. 27, 1958, Ser. No. 769,904

Claims priority, application Sweden Nov. 22, 1957

3 Claims. (Cl. 73—59)

The present invention relates to an apparatus for continuously indicating the viscosity or concentration of a flowing liquid or suspension. The apparatus is of the type which comprises a rotatable vertical shaft, a rotary member adapted to rotate in contact with the liquid or suspension to be controlled and mounted axially on the shaft to be rotated together with it, means for driving the shaft by a constant force or at a constant speed and means for indicating the varying speed of rotation or the resistance against the rotation caused by the varying viscosity or concentration of the liquid. According to one embodiment, to which the invention especially refers, the rotary member consists of a horizontal disc mounted axially on the driving shaft.

When using these known devices, the rotary member has generally been entirely immersed in a container through which the liquid to be controlled is flowing. These devices are primarily useful for controlling liquids and suspensions having a rather high viscosity or concentration. Recently, however, a control of considerably more diluted fibre suspensions has been of increased interest in the pulp and paper industries, but it has then become apparent that the known devices are often not sufficiently sensitive. Of course, this is partly due to an increased influence of the liquid flow at the lower friction which is caused by the diluted suspension, but above all, errors appear to occur because diluted suspensions have a tendency to be centrifuged in contact with the surface of the rotary member. In extreme cases, an almost fibreless zone of liquid may even be formed next to the rotary member. Moreover, the requirements for accuracy or differentiation with regard to the values indicated are rather increased as a more diluted suspension is to be controlled.

According to the invention, these problems are now solved, by mounting the disc so as to be axially movable on the shaft, while means are provided for directing a flow or jet of the liquid substantially axially towards the underside of the disc, whereby the disc is lifted to rest on the liquid flow by its own weight. Thus, the force acting upon the disc from below remains unaltered irrespective of the speed of flow. This effect is of essential importance, as often it is not possible to arrange a flow of liquid especially adapted to the apparatus in question. On the contrary, it is desired to obtain accurate values despite considerable variations in the speed of flow.

When the flow of liquid impinges on the underside of the disc, it is deflected horizontally outwards in all radial directions substantially in the shape of a fan, and the friction against the disc is made almost independent of the energy of motion of the liquid. Further, any centrifugal forces occurring have no influence on the suspension, the composition or consistency of which remains unchanged during the contact with the surface of the disc.

The disc may be shaped slightly concave or convex, but is preferably flat. In relation to its weight, the disc may be given a large surface in contact with the liquid and, if the weight of the disc is small, the contact with the liquid is very light, so that the apparatus becomes responsive also to very slight variations in the viscosity or concentration of the liquid.

The apparatus according to the invention is described in more detail hereinafter with reference to the accompanying drawing, which shows a vertical section of an embodiment.

In the apparatus shown, a turbine wheel is arranged to drive the rotary member by a constant force in the same way as described in British specification No. 619,253, so that the speed of rotation becomes directly dependent upon the viscosity or concentration of the liquid. A disc 1 serving as the rotary member is mounted by means of a key-way connection 2, 3 so as to be slidable in the axial direction on the lower end of a vertical spindle 4, which is supported radially as well as axially by ball bearings 5, 6. The bearings are mounted in a housing 7 enclosing the upper end of the spindle 4. Below the housing 7, the spindle 4 is surrounded by a vessel 8 secured thereto and open at the top. The aforementioned turbine wheel, shown at 9, is mounted upon the upper rim of the vessel 8 and is driven by liquid supplied under constant pressure through a nozzle 10 which is directed substantially tangentially to the turbine wheel 9. The vessel 8 and the turbine wheel 9 are enclosed by a casing 11 secured to the bottom of the housing 7. The liquid driving the turbine flows partly down into the vessel 8 and is partly thrown out against the inside of the casing 11, from where it flows down along the spindle 4 to the disc 1. On rotation, the disc 1 throws the liquid radially outwards, whereby its upper surface is kept clean from deposited impurities which would spoil the results of the measuring.

The ball bearing housing 7, the top of which communicates with an air supply conduit 12, is provided at the bottom with a tubular extension 13 surrounding the spindle 4 and opening into the vessel 8 below the liquid level therein. In dependence upon the speed of rotation, the liquid in the vessel 8 forms a more or less deep paraboloid which determines the resistance to the escape of the air through the tube 13. In this manner, the pressure in the conduit 12 becomes directly proportional to the speed of rotation of the disc 1 and this can be utilized in known manner for indicating and/or regulating the viscosity or concentration of the liquid or suspension to be brought into contact with the rotary disc 1. In the embodiment shown, the conduit 12 is thus connected to a U-tube manometer 14 from which the pressure may be read in mm. water column, for instance. Alternatively or additionally, the varying pressure in the conduit 12 may be utilized in known manner to guide regulating means arranged to maintain a constant viscosity or concentration of the liquid controlled by opening or throttling a valve in a pipe supplying diluting liquid to the liquid controlled.

The spindle 4 is mounted above and axially in alignment with a vertical tube 15 in such a way that at least a little clearance is always present between the disc 1 and the open end of the tube 15. The lower end of the tube 15 is connected to a conduit 16 for supplying the liquid or suspension to be controlled. Preferably, the disc 1 has a diameter equal to or somewhat greater than that of the tube 15. The tube 15 is concentrically surrounded by a wider tube 17 serving to drain off the liquid discharged from the inner tube 15, as well as to form a support for the apparatus proper. As apparent from the drawing, the casing 11 is secured to an angular rod 18, one limb of which is directed downwards and mounted so as to be slidable in the vertical direction in a guide 19 located at the outside of the tube 17. The level of the rotary disc 1 above the orifice of the tube 15 can be adjusted by means of a set screw 20 which is inserted through the horizontal upper limb of the rod 18 to abut the upper end of the guide 19. Another screw 21 is provided for locking the rod 18 in the guide 19 in a desired position.

By means of the screw 20, the apparatus is initially adjusted to such a height that the disc 1, resting against the lower end of the groove 3, is located closely above the upper end of the tube 15. In operation, the spindle 4 carrying the disc 1 is rotated by the turbine wheel 9 and the liquid to be controlled is continuously supplied under pressure through the pipe 16. When overflowing the upper end of the tube 15, the liquid impinges upon the underside of the disc 1 and, provided the speed of flow is not unreasonably low, the disc 1 is thereby lifted to ride on the liquid jet with its entire weight. In contact with the underside of the disc 1, the jet of liquid is deflected substantially radially outwards in all directions, as apparent from the figure.

If the turbine wheel 9 is driven by liquid of a constant pressure, the disc 1 rotates at constant speed so long as the viscosity or concentration of the liquid passing through the tube 15 is unchanged, and a constant difference in pressure, the height H for instance, may then be read off from the manometer 14. An increase or decrease in the speed of flow through the tube 15 merely results in the disc 1 being raised or lowered a little, whereas the value of the manometer remains practically unchanged. On the other hand, even a very slight variation of the concentration of the liquid controlled causes the manometer to indicate a marked change in pressure. Of course, the manometer may be graduated by controlling liquids of known viscosity or concentration. The apparatus described is useful over a wide range for a continuous control of viscosities and concentrations of flowing media of several kinds, although, owing to its high degree of sensitivity, it has proved especially suitable for controlling very diluted fibre suspensions. Thus, it has been shown in practice that pulp concentrations as low as 0.3% may be determined with a quite sufficient accuracy. Such a result is surprising and has probably never before been achieved in continuous operation.

What I claim is:

1. An apparatus for continuously indicating the viscosity and concentration of a flowing liquid or suspension, comprising a rotatable vertical shaft, a horizontal disc mounted movable in axial direction on the shaft but secured against rotation in relation thereto, means for directing a flow of liquid or suspension to be controlled substantially axially towards the underside of the disc, whereby the disc is lifted to rest on the liquid flow by its own weight, means for driving the shaft by a constant force and means for indicating the varying speed of rotation caused by the varying viscosity and concentration of said liquid or suspension.

2. An apparatus according to claim 1, in which the driving shaft carries the disc closely above the upper end of a vertical tube arranged to supply an upward flow of liquid.

3. An apparatus according to claim 1, in which the driving shaft is adjustable in the vertical direction towards and away from the end of the vertical tube.

References Cited in the file of this patent

UNITED STATES PATENTS

| | | |
|---|---|---|
| 2,076,816 | Hess | Apr. 13, 1937 |
| 2,846,873 | Kålle | Aug. 12, 1958 |